United States Patent
Tsai et al.

(10) Patent No.: US 10,256,541 B2
(45) Date of Patent: Apr. 9, 2019

(54) ELECTRONIC DEVICE

(71) Applicant: ASUSTek COMPUTER INC., Taipei (TW)

(72) Inventors: Chien-Hung Tsai, Taipei (TW); Te-Li Lien, Taipei (TW); Wei-Cheng Lo, Taipei (TW); Kuo-Chu Liao, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 63 days.

(21) Appl. No.: 15/591,295

(22) Filed: May 10, 2017

(65) Prior Publication Data

US 2017/0338541 A1    Nov. 23, 2017

(30) Foreign Application Priority Data

May 18, 2016 (CN) .......................... 2016 1 0329442

(51) Int. Cl.
*H01Q 7/00* (2006.01)
*H01Q 1/22* (2006.01)
*H01Q 1/24* (2006.01)
*H04B 5/02* (2006.01)
*H01Q 5/314* (2015.01)

(52) U.S. Cl.
CPC ............. *H01Q 7/00* (2013.01); *H01Q 1/2291* (2013.01); *H01Q 1/243* (2013.01); *H01Q 5/314* (2015.01); *H04B 5/02* (2013.01)

(58) Field of Classification Search
CPC ...... H01Q 1/2225; H01Q 1/48; H01Q 1/0034; H01Q 7/00; H01Q 1/2291; H01Q 1/243; H01Q 5/314; H04B 5/02
USPC .......................................... 343/702, 700 MS
See application file for complete search history.

(56) References Cited

U.S. PATENT DOCUMENTS

| | | | |
|---|---|---|---|
| 9,318,806 B2 * | 4/2016 | Yarga ...................... | H01Q 1/243 |
| 2010/0033380 A1 * | 2/2010 | Pascolini ............... | H01Q 1/243 |
| | | | 343/700 MS |
| 2013/0194138 A1 * | 8/2013 | Hammond ............. | H01Q 1/243 |
| | | | 343/702 |
| 2015/0303568 A1 * | 10/2015 | Yarga ..................... | H01Q 5/321 |
| | | | 343/720 |

FOREIGN PATENT DOCUMENTS

| | | |
|---|---|---|
| CN | 103682619 A | 3/2014 |
| CN | 105261834 A | 1/2016 |

* cited by examiner

*Primary Examiner* — Hai V Tran
(74) *Attorney, Agent, or Firm* — McClure, Qualey & Rodack, LLP

(57) ABSTRACT

An electronic device is provided. The An electronic device comprises a near field communication (NFC) circuit for transmitting a set of near field communication differential signals including a first differential signal and a second differential signal; a housing including a conducting portion with a ground point, a first side and a second side opposite to the first side; and two conductive arms. A current loop is formed by the conductive arm and the conducting portion, and a potential of the ground point is equal to a median potential of the current loop.

10 Claims, 6 Drawing Sheets

ELECTRONIC DEVICE

CROSS-REFERENCE TO RELATED APPLICATION

This application claims the priority benefit of China application serial No. 201610329442.X, filed on May 18, 2016. The entirety of the above-mentioned patent application is hereby incorporated by references herein and made a part of specification.

BACKGROUND OF THE INVENTION

Field of the Invention

The disclosure relates to an electronic device and, more specifically, to an electronic device with a near field communication circuit (NFC).

Description of the Related Art

Currently, housings of most electronic devices are made of metal. To avoid the shielding to the transmission of wireless communication signals from the metal materials, the hole(s) or aperture(s) is usually formed on a portion of the housing that corresponds to the antenna to allow the signals to go through. However, with the hole(s) or aperture(s), the aesthetic feeling of the appearance of the electronic device is affected.

BRIEF SUMMARY OF THE INVENTION

According to a first aspect of the disclosure, an electronic device is provided. The electronic device comprises a near field communication (NFC) circuit, a housing, and two conductive arms. The near field communication (NFC) circuit transmits a set of near field communication differential signals including a first differential signal and a second differential signal, the housing includes a conducting portion with a ground point, a first side and a second side opposite to the first side. An end of a first conductive arm of the two conductive arms is coupled to the first side of the conducting portion, another end of the first conductive arm is coupled to the near field communication circuit to transmit/receive the first differential signal, an end of a second conductive arm of the two conductive arms is coupled to the second side of the conducting portion, another end of the second conductive arm is coupled to the near field communication circuit to transmit/receive the second differential signal. A current loop is formed by the conductive arm and the conducting portion, and a potential of the ground point is equal to a median potential of the current loop.

According to a second aspect of the disclosure, an electronic device is provided. The electronic device comprises a near field communication (NFC) circuit, a housing, and a conductive arm. The near field communication circuit transmits a set of near field communication differential signals including a first differential signal and second differential signal, the housing includes a conducting portion with a ground point, a first side and a second side opposite to the first side. The first side is coupled to the near field communication circuit to transmit/receive the first differential signal. An end of the conductive arm is coupled to the second side of the conducting portion, and another end of the conducting portion is coupled to the near field communication circuit to transmit/receive the second differential signal. A current loop is formed by the conductive arm and the conducting portion, and a potential of the ground point is equal to a median potential of the current loop In sum, in embodiments, the housing of the electronic device is made of metal, and the conducting portion of the housing is taken as a part of the current loop. Therefore, no hole(s) or aperture(s) needs to be formed on the conducting portion, which makes the appearance of the electronic device aesthetic. Additionally, no coils need to be arranged, which saves the cost and the space. Furthermore, since the ground point is set at the median potential of the current loop, the electronic device does not need to include a balance-unbalance converter, which also saves the cost and the space.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Multiple embodiments are described hereinafter accompanying with the figures. For illustrative purpose, some practical details are also described hereinafter. However, it is understood that some practical details are not used to limit the disclosure. That is, in some embodiments of the disclosure, the practical details are not necessary. Additionally, to simplify the figures, some commonly-used structures/components are shown schematically and simply.

Figure 1:
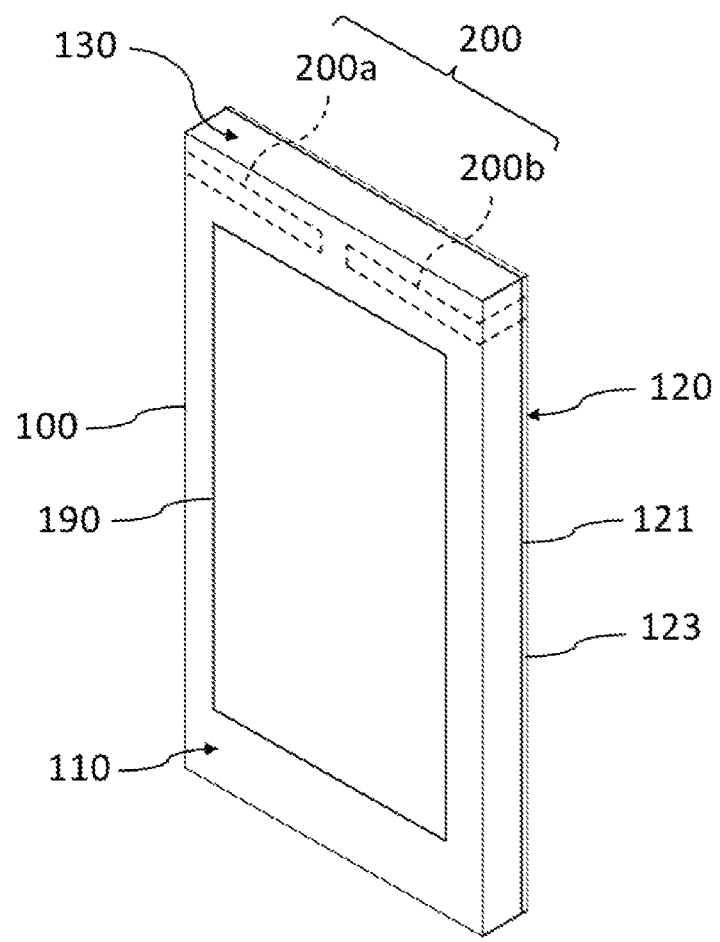
FIG. 1 is a perspective view of an electronic device in a first embodiment.
Figure 2:
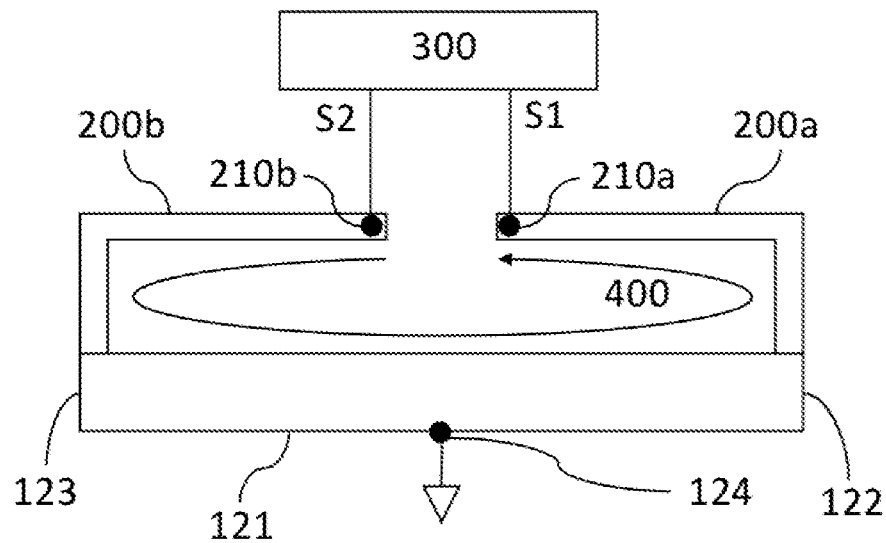
FIG. 2 is a top view of a current loop of the electronic device in the first embodiment.

FIG. 1 is a perspective view of an electronic device in a first embodiment. In the embodiment, an electronic device includes a housing 100 and two conductive arms 200 (namely, a first conductive arm 200a and a second conductive arm 200b). The housing 100 includes a conducting portion 121. The conducting portion 121 is made of metal or other conductive materials. The first conductive arm 200a, the conducting portion 121 and the second conductive arm 200b are coupled in sequence to form a current loop 400 (as shown in FIG. 2). The housing 100 includes a front cover 110 and a back cover 120 that are opposite to each other. The back cover 120 includes the conducting portion 121. In an embodiment, considering the appearance of the housing, a great part or a main part of the two conductive arms 200 is disposed at the front cover 110. In an embodiment, the two conductive arms 200 is disposed at an outer/inner surface of the front cover 110, or embedded at the front cover 110, or disposed in the housing 100 and adjacent the front cover 110. The configuration of the two conductive arms 200 are various, only if the main part of the conductive arm 200 is kept in a certain distance away from the conducting portion 121 to allow the current loop 400 to enclose an area for generating a radiation field. In some embodiments of a housing 100, a distance between the front cover 110 and the back cover 120 is larger than the distance between the conductive arm 200 and the conducting portion 121. The two conductive arms 200 is approximately disposed at the front cover 110, which is not limited.

In an embodiment, the electronic device is an electronic device that supports the NFC technology, such as, a smart phone, a tablet, a notebook and a remote. In the embodiment, the electronic device is a smart phone. In an embodiment, the electronic device includes a screen 190, and the front cover 110 refers to a side of the electronic device with the screen 190. In an embodiment, the electronic device is a notebook (not shown), and the front cover 110 refers to a side with the screen, the back cover 120 refers to a side opposite to the side with the screen. In an embodiment, the electronic device has no a screen, the front cover 110 of the electronic device refers to a side with an operating surface, and the back cover 120 of the electronic device refers to a side opposite to the side with the operating surface. In an embodiment, the electronic device is a remote, the front cover 110 of the remote refers to a side with operating buttons, and the back cover 120 of the remote refers to the side opposite to the side with operating buttons.

The conductive arm 200 is made of metal (such as, copper, aluminum, aluminum alloy and aluminum magnesium alloy) or conductive materials (such as, indium tin oxide (ITO), gallium-indium-tin oxide (GITO), zinc-indium-tin oxide (ZITO), fluorine-doped tin oxide (FTO), zinc oxide, aluminum zinc oxide (AZO (Al:ZnO)) and indium oxide zinc (IZO)). The shape of the conductive arm 200 is not limited herein. In an embodiment, the structure of the conductive arm 200 is designed only for the current loop 400. In an embodiment, the conductive arm 200 is the whole or a part of electronic element (such as an antenna of other communication circuits, a printed circuit board (PCB), a Flexible Printed Circuit (FPC)) or assembly (such as a shielding case or a frame and conductive wires of the screen) of the electronic device.

In some embodiments, the current loop 400 is disposed adjacent an upper side surface of the housing 100. In other embodiments, the current loop 400 is disposed adjacent other side surfaces (such as a lower side surface), which is not limited herein. In an embodiment, if the intensity of the radiation field is adequate (or the size of the housing is small), the current loop 400 is located at the middle portion of the housing 100.

Figure 3:
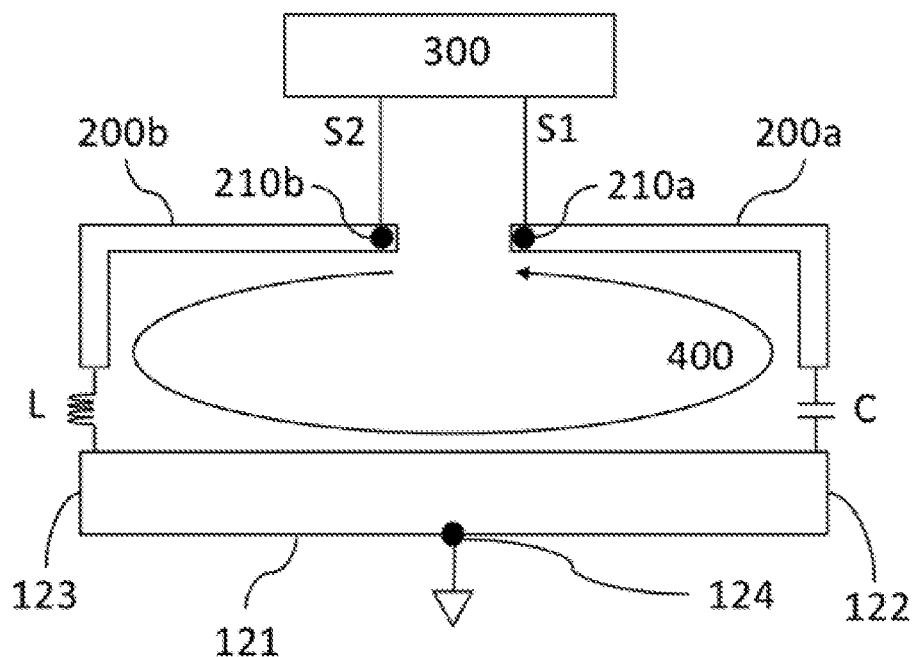
FIG. 3 is a top view of a current loop of an electronic device in a second embodiment.

FIG. 2 is a top view of a current loop 400 of the electronic device in the first embodiment. Please refer to FIG. 1 and FIG. 2, the conducting portion 121 includes a first side 122 and a second side 123 that are opposite to each other. An end of the first conductive arm 200a is coupled to the first side 122 of the conducting portion 121. An end of the second conductive arm 200b is coupled to the second side 123 of the conducting portion 121. Thus, the first conductive arm 200a, the conducting portion 121 and the second conductive arm 200b are coupled in sequence to form the current loop 400. The current loop 400 is an open loop. The ends of the current loop 400 include feed points 210a, 210b, respectively. The feed points 210a, 210b do not directly electrically connected with each other. The end of the first conductive arm 200a that is not coupled to the conducting portion 121 includes the feed point 210a. The end of the second conductive arm 200b that is not coupled to the conducting portion 121 includes the feed point 210b. In the embodiment, the first conductive arm 200a and the second conductive arm 200b extend from the ends with the feeder point 210a, 210b, respectively, and away from each other. Then, the first conductive arm 200a and the second conductive arm 200b bend to be coupled to the conducting portion 121, respectively. In an embodiment, the conducting portion 121 is electrically connected to the first conductive arm 200a and the second conductive arm 200b. In the embodiment, the conducting portion 121 directly connected to the first conductive arm 200a and the second conductive arm 200b, respectively. In some embodiments, the conducting portion 121 is coupled to the first conductive arm 200a and second conductive arm 200b via a capacitor C and an inductor L (as shown in FIG. 3), respectively. In an embodiment, the first conductive arm 200a and the second conductive arm 200b are same structures that are symmetrically arranged, which is not limited herein. In an embodiment, the lengths or the shapes of the first conductive arm 200a and the second conductive arm 200b are different.

In an embodiment, the near field communication circuit 300 is integrated into an integrated circuit (IC), for transmitting a set of NFC differential signals including a first differential signal S1 and a second differential signal S2. To determine a ground voltage level, the near field communication circuit 300 further includes a grounded point (not shown)). In the embodiment, the first differential signal S1 is a positive signal, and the second differential signal S2 is a negative signal. In an embodiment, the first differential signal S1 is a negative signal, and the second differential signal S2 is a positive signal. The feed point 210a of the first conductive arm 200a is coupled to the near field communication circuit 300 to receive the first differential signal S1, and the feed point 210b of the second conductive arm 200b is coupled to the near field communication circuit 300 to receive the second differential signal S2. The conducting portion 121 includes a ground point 124. The potential of the ground point 124 is equal to a median potential of the current loop 400. Thus, the first differential signal S1 and the second differential signal S2 output from the near field communication circuit 300 go through the current loop 400 (or induced by the current loop 400 to be transmitted to the near field communication circuit 300). With such a configuration, no coils are needed for an antenna, which saves the cost and space. Additionally, since the housing 100 acts as a part of the current loop 400, even if the housing 100 is made of metal, the NFC capability of the electronic device is not affected. Therefore, in the embodiment, no hole(s) or aperture(s) needs to be formed on the conducting portion 121 of the housing 100.

Since the potential of the ground point 124 is equal to the median potential of the current loop 400, the potential difference between the feed point 210a and the ground point 124 is equal to that between the ground point 124 and the feed point 210b. In an embodiment, two or more ground points with equal potential are used. With the ground point 124 at the conducting portion 121, no balance-unbalance (Balun) converter needs to be configured between the near field communication circuit 300 and the current loop 400, which also saves the cost and the space. Moreover, the set of the symmetrical NFC differential signals reduces the interference of the noises.

In the embodiment, the conducting portion 121 is the whole back cover 120 made of metal. In an embodiment, the whole conducting portion 121 is made of one metal. In an embodiment, parts of the conducting portion 121 are made of different metals. The metal is copper, aluminum, aluminum alloy or aluminum magnesium alloy. In an embodiment, the conducting portion 121 is a part of the back cover 120, such as a metal decorative strip, and other parts of the back cover 120 are made of non-metal materials, such as plastic (Makrolon), silicone, wood and bamboo.

FIG. 3 is a top view of a current loop 400 of an electronic device in a second embodiment. In FIG. 3, in the embodiment, the first conductive arm 200a is coupled to the conducting portion 121 via the capacitor C, and the second conductive arm 200b is coupled to the conducting portion 121 via the inductor L. With the configuration of the capacitor C and the inductor L, an impedance matching between the current loop 400 and the near field communication circuit 300 is adjusted. In an embodiment, the first conductive arm 200a is coupled to the conducting portion 121 via the inductor L, and the second conductive arm 200b is coupled to the conducting portion 121 via the capacitor C. In other words, the first conductive arm 200a and the second conductive arm 200b are coupled to the conducting portion 121 via the capacitor C or the inductor L, respectively.

Figure 4:
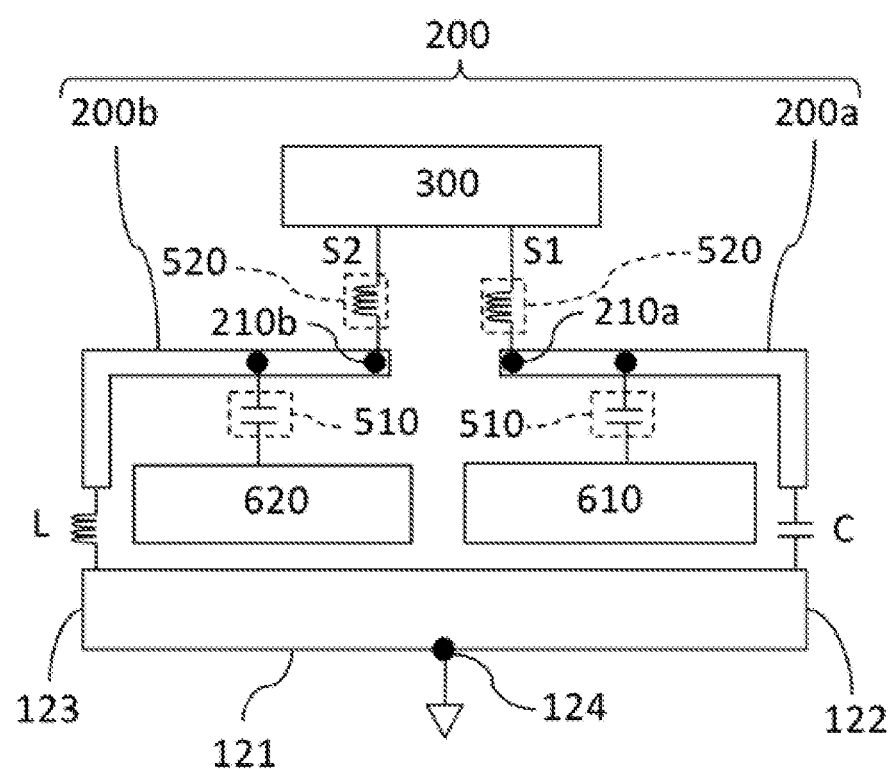
FIG. 4 is a top view of a current loop of an electronic device in a third embodiment.

FIG. 4 is a top view of a current loop 400 of an electronic device in a third embodiment. In FIG. 4, the electronic device further includes a plurality of non-NFC circuits. In the embodiment, the non-NFC circuits is a Wi-Fi circuit 610 and a mobile communication circuit 620. The Wi-Fi circuit 610 is coupled to one of the conductive arms 200 (that is, the first conductive arm 200a) via a first energy storage component 510. The mobile communication circuit 620 is coupled to another conductive arm 200 (that is, the second conductive arm 200b) via another first energy storage component 510. The near field communication circuit 300 is coupled to the first conductive arm 200a and the second conductive arm 200b via a second energy storage component 520, respectively. In the embodiment, the first energy storage component 510 is a capacitor, and the second energy storage component 520 is an inductor accordingly. Since the capacitor supports a high-frequency signal, the inductor supports a low-frequency signal and the operating frequency band of the near field communication circuit 300 differs from that of the non-NFC circuits, the conductive arm 200 can be shared the near field communication circuit 300 and the non-NFC circuits for wireless communication. In the embodiment, the connecting point of the first conductive arm 200a configured to connect with the Wi-Fi circuit 610 is adjustable according to the required length of the current path (which relates to the operating frequency). The connecting point of the second conductive arm 200b configured to connect with the mobile communication circuit 620 is adjustable according to the required length of the current path (which also relates to the operating frequency).

Figure 5:
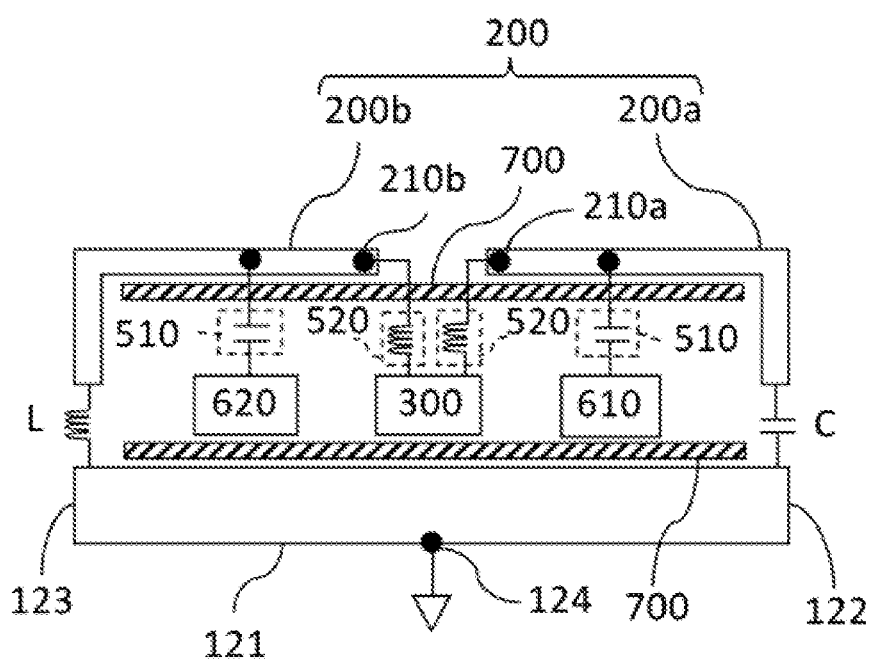
FIG. 5 is a top view of a current loop of an electronic device in a fourth embodiment.

FIG. 5 is a top view of a current loop 400 of an electronic device in a fourth embodiment. The near field communication circuit 300 in FIG. 2, FIG. 3 and FIG. 4 is shown outside an area enclosed by the conductive arm 200 and the conducting portion 121. As shown in FIG. 5, the near field communication circuit 300 is disposed inside the housing 100, that is, in an area enclosed by the conductive arm 200 and the conducting portion 121. In FIG. 5, the electronic device further includes Ferrite sheets 700. One Ferrite sheet is disposed between the near field communication circuit 300 and the conductive arm 200, and between the non-NFC circuit (such as the Wi-Fi circuit 610 and the mobile communication circuit 620)) and the conductive arm 200. Another Ferrite sheet is disposed between the near field communication circuit 300 and the conducting portion 121 to reduce eddy currents generated on the conductive arm 200 and the conducting portion 121.

Figure 6:
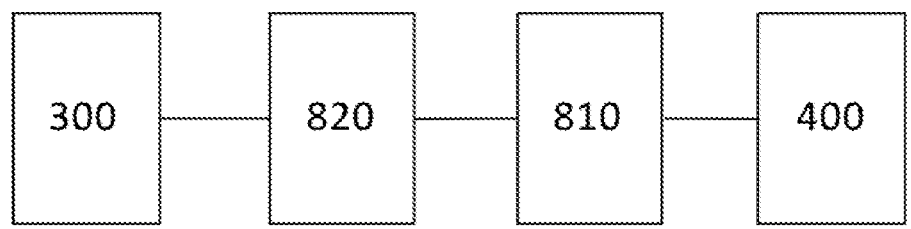
FIG. 6 is a block diagram showing a circuit of an electronic device in an embodiment.

FIG. 6 is a block diagram showing a circuit of an electronic device in an embodiment. As shown in FIG. 6, the electronic device further includes an impedance matching circuit 810 and a signal-amplifying circuit 820. In an embodiment, the signal-amplifying circuit 820 is coupled between the near field communication circuit 300 and the current loop 400. In the embodiment as shown in FIG. 6, the signal-amplifying circuit 820 is coupled between the near field communication circuit 300 and the impedance matching circuit 810. The signal-amplifying circuit 820 amplifies the set of the NFC differential signals outputted from the near field communication circuit 300 to enhance the intensity of the radiation field converted by the current loop 400 to increase the sensing distance.

Figure 7:
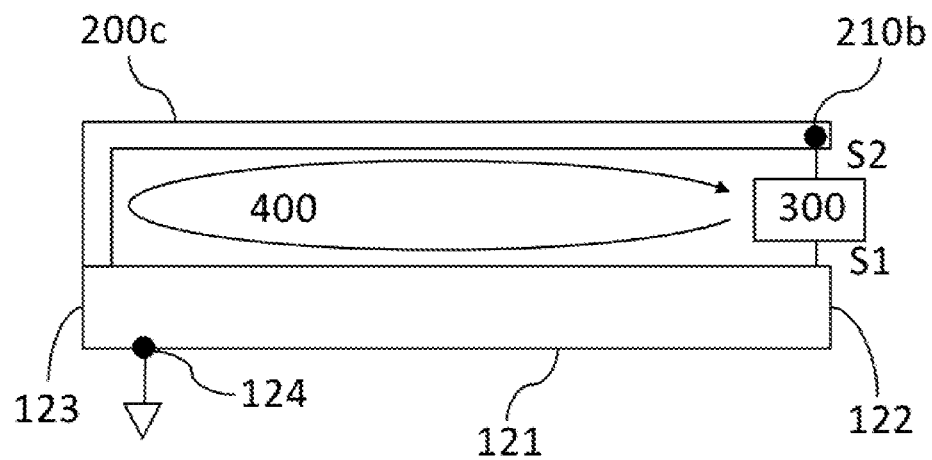
FIG. 7 is a top view of a current loop of an electronic device in a fifth embodiment.
Figure 8:
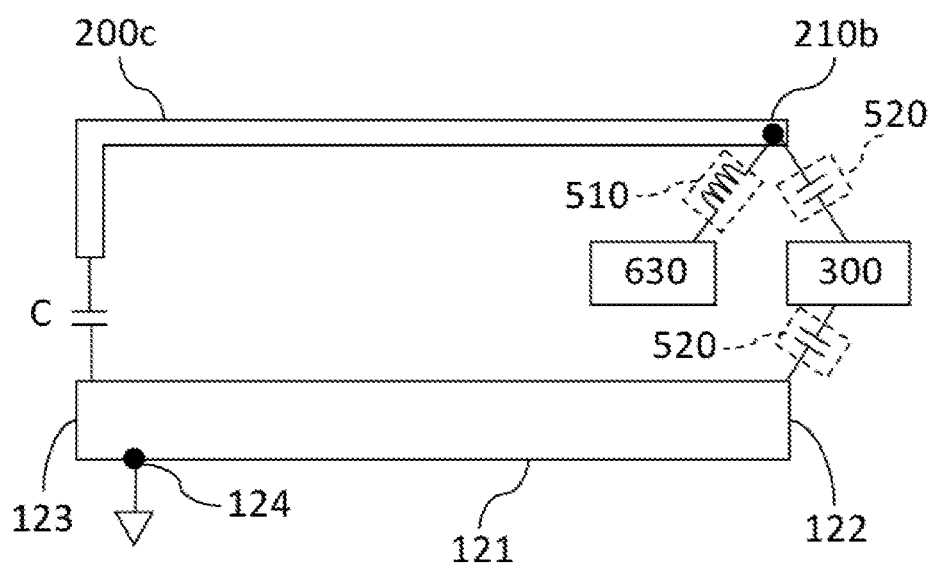
FIG. 8 is a top view of a current loop of an electronic device in a sixth embodiment.

FIG. 7 is a top view of a current loop 400 of an electronic device in a fifth embodiment. As shown in FIG. 7, a single conductive arm 200c is configured in the embodiment. An end of the conductive arm 200c is coupled to the second side 123 of the conducting portion 121, and another end of the conductive arm 200c includes a feed point 210b that is coupled to the near field communication circuit 300 to transmit the second differential signal S2. Similarly the conducting portion 121 is the electrically connected with the conductive arm 200c. In the embodiment, the conducting portion 121 is directly connected with the conductive arm 200c. In an embodiment, the conducting portion 121 and the conductive arm 200c are coupled via a capacitor C (as shown in FIG. 8) or an inductor. The near field communication circuit 300 is further coupled to the first side 122 of the conducting portion 121 to transmit the first differential signal S1. In such a way, similarly, the conductive arm 200c and the conducting portion 121 form a current loop 400. The conducting portion 121 also includes a ground point 124. The potential of the ground point 124 is equal to a median potential of the current loop 400. In the embodiment, since the number of the conductive arm 200c is one, the ground point 124 is located close to the second side 123.

FIG. 8 is a top view of a current loop 400 of an electronic device in a sixth embodiment. Similarly, the electronic device includes a non-NFC circuit. In the embodiment, the non-NFC circuit is a touch control circuit 630 (that is, a control circuit of a touch control module for a touch-sensitive screen). The touch control circuit 630 is coupled to the conductive arm 200c via the first energy storage component 510. The near field communication circuit 300 is coupled to the conductive arm 200c and the conducting portion 121 via the second energy storage components 520, respectively. In the embodiment, the first energy storage component 510 is an inductor. The second energy storage components 520 are capacitor. The conductive arm 200c is touch control electrode wires of the touch-sensitive screen.

In sum, in the embodiments, the housing of the electronic device is made of metal, and the conducting portion of the housing acts as a part of the current loop. Therefore, no hole(s) or aperture(s) needs to be formed on the conducting portion, which makes the appearance of the electronic device aesthetic. Additionally, no coils need to be applied, which saves the cost and the space. Furthermore, in embodiments, since the ground point is set at the median potential of the current loop, the electronic device does not need a balance-unbalance converter, which also saves the cost and the space. Moreover, in embodiments, since the current loop is disposed adjacent to the side of the housing, the side of the housing would be placed in the sensing area intuitively when the user uses the NFC function. On the other hand, since the current loop is disposed adjacent to the side of the housing, the radiation field covers the front side and the back side of the housing. Thus, the electronic device has a higher sensing success ratio than a conventional electronic device. In contrast, a conventional NFC module is usually disposed at the back side of a device, and therefore only the back side of the device can be sensed. The exact position of the conventional NFC module is not easily determined at the back side of the device, which results in sensing failures. In addition, in the embodiments, the current loop can be shared with other circuits and no other conductive arm needs to be added.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device comprising:
   a near field communication (NFC) circuit configured to transmit/receive a set of near field communication differential signals including a first differential signal and a second differential signal;
   a housing including a conducting portion with a ground point, a first side and a second side opposite to the first side, wherein the ground point is located at a middle of the conducting portion; and
   two conductive arms, wherein an end of a first conductive arm of the two conductive arms is coupled to the first side of the conducting portion, another end of the first conductive arm is coupled to the near field communication circuit to transmit/receive the first differential signal, an end of a second conductive arm of the two conductive arms is coupled to the second side of the conducting portion, another end of the second conductive arm is coupled to the near field communication circuit to transmit/receive the second differential signal;
   wherein a current loop is formed by the first conductive arm, the conducting portion and the second conductive arm, and a potential of the ground point is equal to a median potential of the current loop.

2. The electronic device according to claim 1, wherein the two conductive arms are coupled to the conducting portion via a capacitor or an inductor, respectively.

3. The electronic device according to claim 1, wherein the electronic device further comprises a non-NFC circuit coupled to one of the two conductive arms via a first energy storage component, the first energy storage component is an inductor or a capacitor, the near field communication circuit is coupled to the current loop via two second energy storage components that are different from the first energy storage component.

4. The electronic device according to claim 1, further comprising a signal-amplifying circuit coupled between the near field communication circuit and the current loop.

5. The electronic device according to claim 1, wherein the current loop is configured adjacent to a side of the housing.

6. An electronic device comprising:
   a near field communication circuit configured to transmit/receive a set of near field communication differential signals including a first differential signal and second differential signal;
   a housing including a conducting portion with a ground point, a first side and a second side opposite to the first side, wherein the ground point is located at a middle of the conducting portion, and the first side is coupled to the near field communication circuit to transmit/receive the first differential signal; and
   a conductive arm, wherein an end of the conductive arm is coupled to the second side of the conducting portion, and another end of the conductive arm is coupled to the near field communication circuit to transmit/receive the second differential signal;
   wherein a current loop is formed by the conductive arm and the conducting portion, and a potential of the ground point is equal to a median potential of the current loop.

7. The electronic device according to claim 6, wherein the conductive arm is coupled to the conducting portion via a capacitor or an inductor.

8. The electronic device according to claim 6, wherein the electronic device further comprises a non-NFC circuit coupled to the conductive arm via a first energy storage component, the first energy storage component is an inductor or a capacitor, the near field communication circuit is coupled to the current loop via two second energy storage components that are different from the first energy storage component.

9. The electronic device according to claim 6, further comprising a signal-amplifying circuit coupled between the near field communication circuit and the current loop.

10. The electronic device according to claim 6, wherein the current loop is configured adjacent to a side of the housing.

* * * * *